United States Patent [19]
Gilmore et al.

[11] 3,993,956
[45] Nov. 23, 1976

[54] DIGITAL DETECTION SYSTEM FOR DIFFERENTIAL PHASE SHIFT KEYED SIGNALS

[75] Inventors: Merle Lee Gilmore, Fort Lauderdale; Francis Robert Steel, Parkland, both of Fla.; John Anthony Tempka, Glenview, Ill.

[73] Assignee: Motorola, Inc., Schaumburg, Ill.

[22] Filed: Nov. 3, 1975

[21] Appl. No.: 628,018

[52] U.S. Cl. .............................. 325/320; 235/156; 325/324; 325/477; 329/104; 329/120
[51] Int. Cl.² .................... H03D 3/06; H03K 9/04; H04B 1/10
[58] Field of Search ............ 235/181; 325/320, 321, 325/322, 323, 324, 474, 476; 329/104, 110, 112, 122, 123, 124, 137

[56] References Cited
UNITED STATES PATENTS

| | | | |
|---|---|---|---|
| 3,600,700 | 8/1971 | Matsuo .............................. | 329/124 |
| 3,638,125 | 1/1972 | Goell .................................. | 325/320 |
| 3,646,446 | 2/1972 | Rittenbach ........................ | 325/320 |
| 3,806,815 | 4/1974 | Fletcher et al. .................. | 325/320 |
| 3,909,735 | 9/1975 | Anderson et al. ................ | 329/122 |
| 3,921,075 | 11/1975 | Denny ................................ | 329/104 |
| 3,924,197 | 12/1975 | Okano et al. ..................... | 329/104 |
| 3,944,939 | 3/1976 | Le Mouel ........................... | 329/104 |

OTHER PUBLICATIONS
Lee et al., On the Binary DPSK Communications Systems in Correlated Gaussian Noise, IEEE Transactions on Communications, Feb. 1975, pp. 255–259.

*Primary Examiner*—Felix D. Gruber
*Attorney, Agent, or Firm*—Donald B. Southard; James W. Gillman

[57] ABSTRACT

A digital detection system for binary differential phase shift keyed (DPSK) signals includes first and second multipliers to which the signal is applied, and which receive reference signals applied in quadrature to the two multipliers. The outputs of the multipliers are each applied through a filter to a one bit delay circuit, with the outputs of the filters and delay circuits being applied to third and fourth multipliers. The outputs of the third and fourth multipliers which receive signals from the two filters are summed to provide the detected digital signal. The filters may be matched filters each including an integrate, sample and dump circuit, and a data transition tracking loop coupled to the first multiplier and to the detector system output provides a bit synchronization signal for the matched filters. An I-Q loop may be coupled to the outputs of the two matched filters and controls an oscillator which provides the reference signals for the first and second multipliers. The addition of two multipliers and three summing circuits can extend the detection system for use with quaternary (four-phase) differential phase shift keyed signals.

16 Claims, 5 Drawing Figures

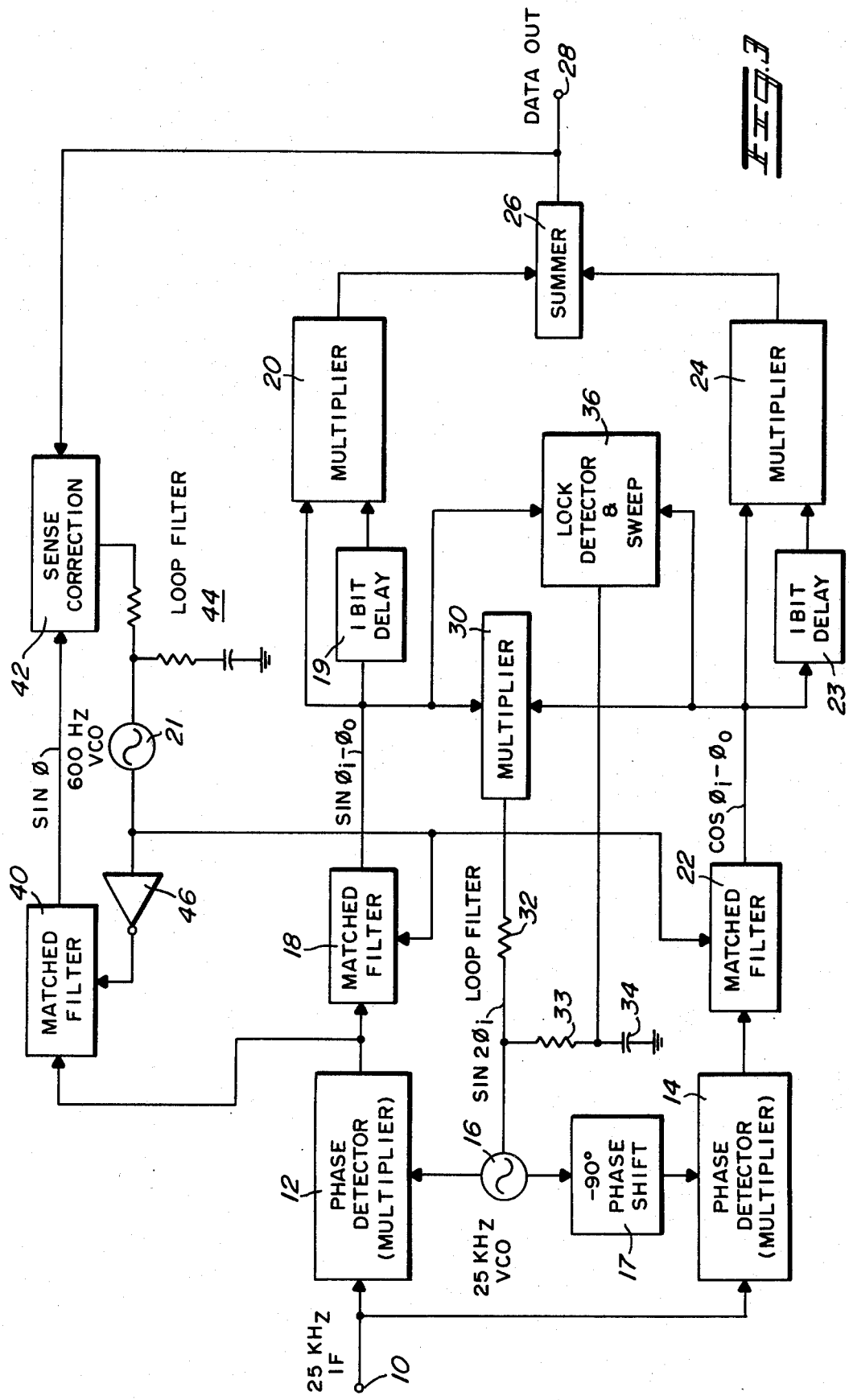

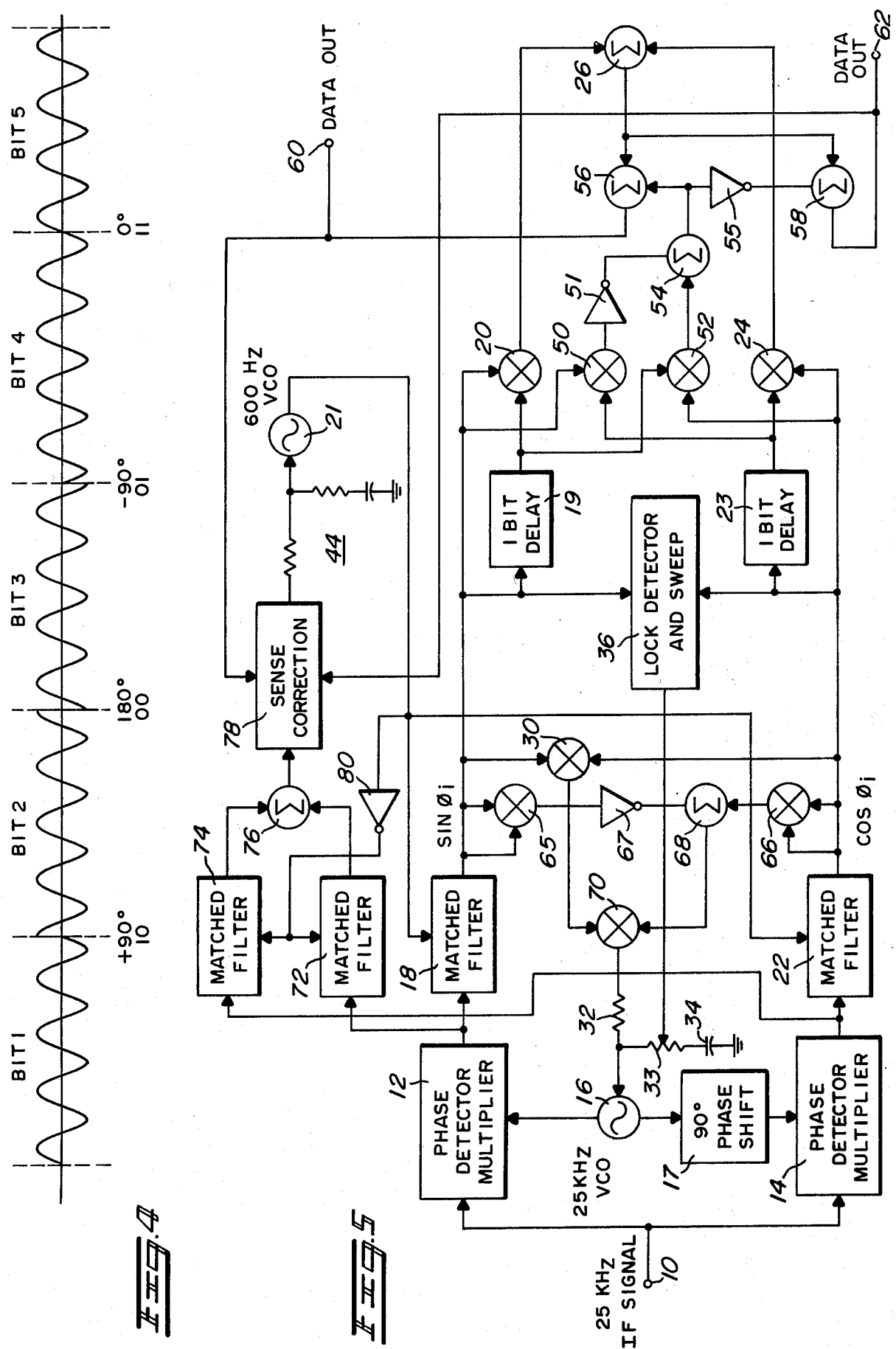

DIGITAL DETECTION SYSTEM FOR DIFFERENTIAL PHASE SHIFT KEYED SIGNALS

BACKGROUND OF THE INVENTION

Phase shift keying of digital signals has been used for low power signal transmission, and has been found to be more efficient than frequency shift keying. Coherent phase shift keying has been used but has the disadvantage that it is necessary to derive an accurate phase reference signal for use in the detection process at the receiver. To avoid this, differential phase shift keying, wherein the information is transmitted by the changes in phase, has been used, and this has been found to have the advantage that it is more tolerant of channel variations.

In prior differential phase shift systems, the detection circuits have used delay lines or high Q, accurately tuned circuits for storing one bit of the signal to compare the next bit therewith. These circuits are quite critical and costly. Further, delay lines and high Q, precision tuned circuits cannot be implemented in integrated circuit form, and cannot be provided as small inexpensive items as required for many applications, such as paging receivers. Prior detection circuits also consumed substantial power, which is particularly objectionable in portable devices.

SUMMARY OF THE INVENTION

It is an object of this invention to provide an improved digital detection system for differential phase shift keyed signals.

A further object of the invention is to provide a detection system for binary or quaternary differential phase shift keyed signals which can be implemented in integrated circuit form.

Another object of the invention is to provide a detection system for differential phase shift keyed signals which requires minimum operating power, and which can be provided in compact form.

A still further object of the invention is to provide a detection system for differential phase shift keyed signals which utilizes signal multipliers; integrate, sample and dump circuits; and devices for storage, multiplication and addition of the sampled values, all of which can be provided as integrated circuits.

In practicing the invention, a binary differential phase shift detection system includes first and second phase detectors which operate as linear signal mixers to multiply the received signal with quadrature reference waves. A matched filter is coupled to the output of each detector, and receives a bit synchronization signal provided by a data transition tracking loop. Each matched filter integrates the signal and samples the same at the end of each bit, with the sample being applied to a multiplier and through a one bit delay circuit to a second input of the multiplier. The output signals from the two multipliers are summed and quantized to two levels to provide the digital output signal of the detection system. The quadrature reference waves are provided by a voltage controlled oscillator which is controlled by an I-Q loop including a further multiplier coupled to the matched filters and applying a control voltage through a loop filter to the oscillator. A sweep and lock circuit is also coupled to the loop filter to initially bring the oscillator into frequency. The data transition tracking loop includes a further matched filter coupled to one of the phase detectors, a sense correction circuit coupled to the summer of the detection system, and a loop filter which applies control signals to a bit synchronization oscillator. This oscillator applies a synchronization signal to the two matched filters, and through an inverter to the further matched filter.

The system of the invention can also be used to detect four phase DPSK signals, with the undelayed output of the first matched filter being one input and the delayed output of the second matched filter being the other input to a third multiplier. Similarly, the delayed output of the first filter and the undelayed output of the second filter are the inputs to a fourth multiplier. The outputs of the third and fourth multipliers are subtracted to produce a signal corresponding to the sine of the phase difference between the instant and the previous signal bit, whereas the summed outputs of the first and second multipliers produce a signal corresonding to the cosine of the phase difference. Finally, the sine and cosine signals are added and quantized to provide one binary output signal and substracted and quantized to produce a second and independent binary output signal. The two binary output signals cooperate to provide the quaternary output of the four phase detector system.

BRIEF DESCRIPTION OF THE DRAWINGS

FIG. 3 is a complete block diagram of the system of the invention;

FIG. 4 illustrates a quaternary differential phase shift keyed signal which can be detected by the system of the invention; and FIG. 5 is a block diagram of a second embodiment of the detection system of the invention.

DETAILED DESCRIPTION

Figure 1:
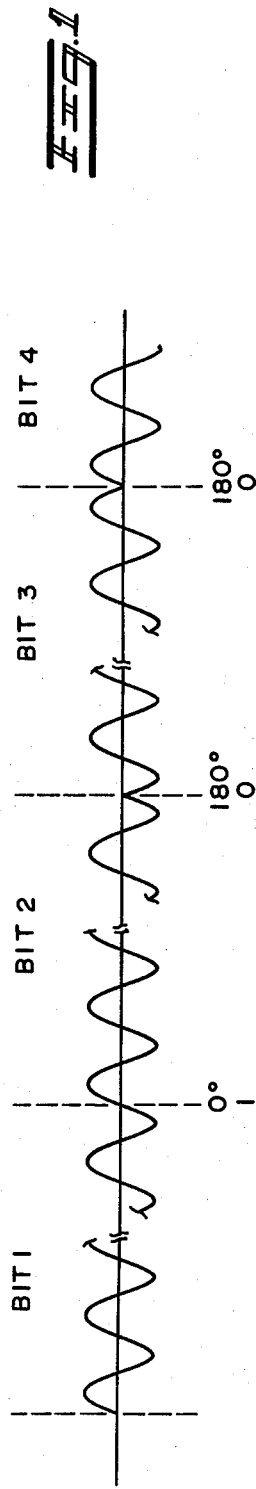
FIG. 1 illustrates a binary differential phase shift keyed digital signal which can be detected by the system of the invention.

In FIG. 1, there is illustrated a binary digital differential phase shift keyed signal. Four bits of the digital signal are shown. The carrier frequency may be 25 kilohertz (KHz) and the bit frequency may be 600 hertz (Hz). The carrier frequency may be the IF frequency of a superheterodyne receiver. It is pointed out that the detector system of the invention can be used in other applications, and at other carrier frequencies and bit rates, and the values given are merely representative.

In FIG. 1 there is no change in phase between bit one and bit two, but there is a change in phase between bit two and bit three. The phase of the signal is always either unchanged from one bit to the next, or changed by 180°, but the change will not be as abrupt as shown in FIG. 1. The binary information of the signal is provided by the "baud" at the transition from one bit to the next, with no change in phase producing a binary "one" (1) and a change of 180° producing a binary "zero" (0). In the signal shown in FIG. 1, the binary number represented is 100.

Figure 2:
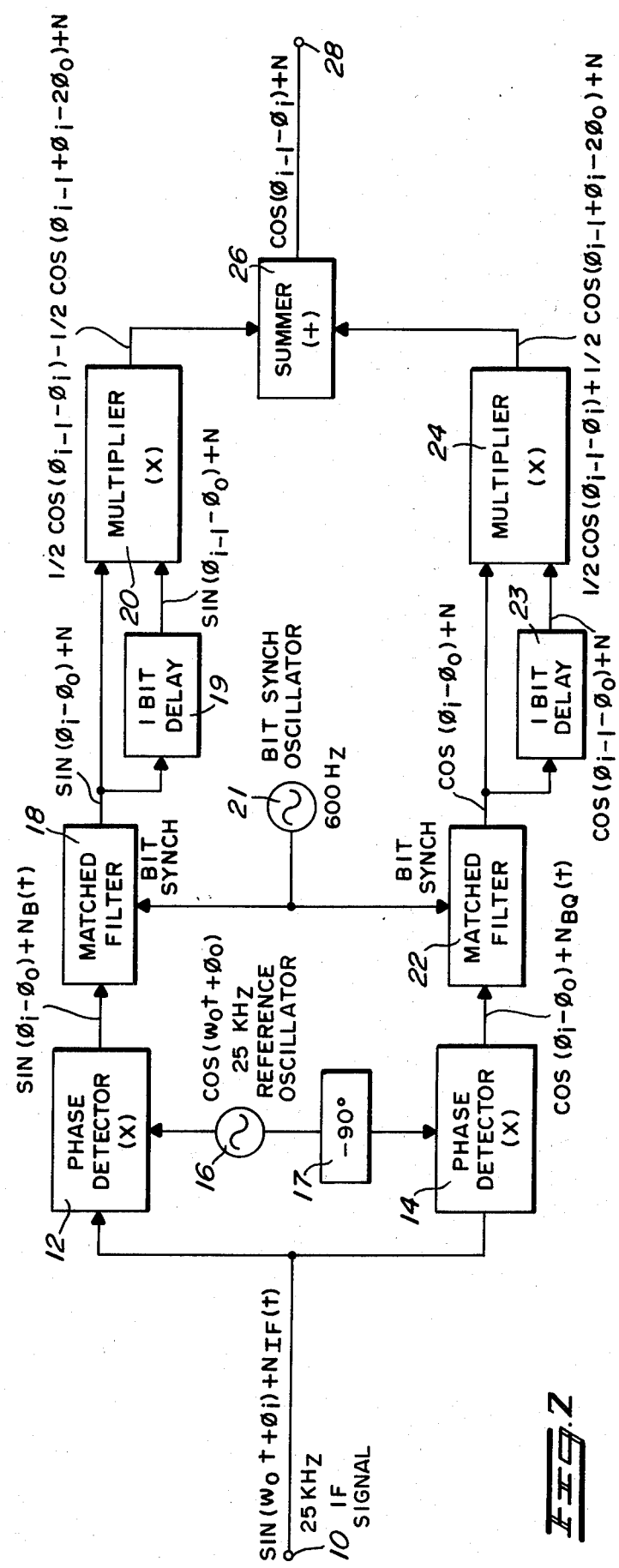
FIG. 2 is a simplified block diagram of the detection system of the invention.

A block diagram of the detector system of the invention is shown in FIG. 2. The differential phase shift signal is applied at input terminal 10 and passed to the two phase detectors 12 and 14. The phase detectors are linear multiplier circuits and multiply the received carrier voltage wave by a reference wave from local oscillator 16, which operates at approximately the frequency $\omega_o$ of the received wave. This results in a baseband signal, which is basically a direct current signal.

The output of the phase detector 12 is applied to a matched filter 18, which may be of a type which is well known in the art. The matched filter 18 may be an integrate, sample and dump circuit which is controlled by a bit synchronization signal applied from circuit 21 so that the filter will be cleared at the end of a bit to receive the signal representing the next bit. The integrated signal will be sampled at the end of the bit and then dumped, so that the filter is ready to integrate the next bit signal.

The output of the matched filter 18 is applied to one input of multiplier circuit 20, and applied through the delay circuit 19 to a second input of the multiplier circuit 20. The delay circuit 19 provides a one bit delay, so that the multiplier multiplies each bit by the preceding bit which has been delayed.

The second phase detector 14 receives the reference wave from the local oscillator 16 through the phase change circuit 17, which delays the phase of the local oscillations by 90°. The output of the phase detector 14 is applied to matched filter 22, which may be identical to filter 18. The output of filter 22 is applied to one input of multiplier circuit 24, and is applied through delay circuit 23 to the second input of multiplier 24. The delay circuit 23 provides a one bit delay, and this circuit and the multiplier 24 may be identical to the delay circuit 19 and the multiplier circuit 20.

The outputs of the two multiplier circuits 20 and 24 are applied to a summing circuit 26 which produces an output signal at terminal 28. This signal indicates whether the phase of a bit is the same as that of the preceding bit, or is reversed (180° out of phase) with respect to the preceding bit. The detector system, therefore, operates in a differential manner, with the output signal indicating the baud at the transition from one bit to the next.

On the block diagram of FIG. 2, the trigonometric representation of the signal is shown at a plurality of points to explain the operation of the system. The differential phase shift input signal is represented as:

$$\sin(\omega_o t + \phi_i) + N_{IF}(t);$$

where $\phi_i$ is the phase of the bit being detected, and $N_{IF}(t)$ is the noise accompanying the signal. The input signal may be the IF signal from a superheterodyne radio receiver which has been limited, so that the applied signal has an adequate level for processing. The accompanying noise is approximately the white noise which extends through the IF frequency band of the receiver, being shaped by the receiver selectivity.

The signal at the output of phase detector 12 is represented as:

$$\sin(\phi_i - \phi_o) + N_B(t);$$

where $\phi_o$ is the phase of the reference wave from oscillator 16, and $N_B(t)$ is the baseband noise in the in-phase branch of the detection system. The phase $\phi_o$ may account for a slight frequency error between the reference wave and the received signal.

In the above representation, and in the following, the $2 \times \omega_o$ term is omitted as the subsequent elements of the system will not respond to this frequency, and this term will be lost.

The signal at the output of the matched filter 18 is represented as:

$$\sin(\phi_i - \phi_o) + N;$$

where N is the filtered baseband noise which remains constant for the duration of a bit. Since this noise term is not significant in understanding the basic operation of the detector system, the symbol N will be used for the filtered baseband noise term in both the in-phase and quadrature branches, for both the bit being considered ($i$ bit) and the preceding bit ($i$-1 bit), and for noise terms resulting from products and additions.

The signal at the output of the matched filter 18 is applied to the multiplier 20 along with the signal from delay circuit 19 which is represented as:

$$\sin(\phi_{i-1} - \phi_o) + N.$$

The output of the multiplier then becomes:

$$\tfrac{1}{2} \cos(\phi_{i-1} - \phi_i) - \tfrac{1}{2} \cos(\phi_{i-1} + \phi_i - 2\phi_o) + N.$$

The signal from the phase detector 14 is similar to that from phase detector 12, but since the phase of the local oscillator 16 is delayed by 90°, the signal at the output of the detector 14 becomes:

$$\cos(\phi_i - \phi_o) + N_{BQ}(t);$$

where $N_{BQ}$ is the noise at baseband in the quadrature branch of the detector system.

The signal at the output of matched filter 22 is:

$$\cos(\phi_i - \phi_o) + N;$$

and the signal at the output of delay circuit 23 is:

$$\cos(\phi_{i-1} - \phi_o) + N.$$

The signal at the output of the multiplier 24 is represented as:

$$\tfrac{1}{2} \cos(\phi_{i-1} - \phi_i) + \tfrac{1}{2} \cos(\phi_{i-1} + \phi_i - 2\phi_o) + N.$$

The summing circuit 26 adds the two output signals from the multipliers 20 and 24 and produces at the output terminal 28 the signal:

$$\cos(\phi_{i-1} - \phi_i) + N.$$

When the phase of the bit being considered $\phi_i$ and the preceding bit $\phi_{i-1}$ are the same, the output is cos 0° or 1, and this represents a binary one (1). When the phase of the bit being considered $\phi_i$ is out of phase (reversed) from the preceding bit $\phi_{i-1}$ the output is cos 180° or −1, and this represents a binary zero (0).

The system of the invention has the advantage that the noise $N_{IF}(t)$ is mixed linearly down to baseband $N_B(t)$ and filtered before it encounters the nonlinearity of the multipliers (20 and 24), and a threshold is avoided. The binary output signal is therefore affected by noise to the minimum possible extent.

FIG. 3 shows the block diagram of the system of FIG. 2 with the elements added which can be used to control the reference oscillator 16 and the bit synchronization oscillator 21. The circuit for controlling the reference oscillator 16 can be an I-Q loop, which is known in the art. A multiplier 30 is connected to the outputs of the two matched filters 18 and 22 which receive signals from the phase detectors 12 and 14. The multiplier output is applied through the loop filter formed by resistors 32 and 33 and capacitor 34 to control the oscillator 16, which can be a voltage controlled oscillator of known type. The I-Q loop calculates the sine of twice the angle $\phi_i$ and this signal controls the reference oscillator 16.

In order to bring the oscillator 16 into frequency, if it has a frequency substantially different than the received frequency, a lock detector and sweep circuit 36 is provided. This applies a voltage across capacitor 34 which causes the frequency of oscillator 16 to sweep until the frequency of the received wave is reached. This circuit can also be of known construction.

The action of the reference oscillator control circuit (I-Q loop) is similar to that of a squaring loop, preceded by a band pass filter. The filters 18 and 22 in FIG. 5, form the filter before the nonlinearity in the I-Q loop. Inasmuch as this control circuit utilizes the phase detectors and matched filters of the differential phase detector system, only the multiplier 30 and loop filter must be added, so that the number of elements is minimized. Accordingly, the system is relatively simple and inexpensive. Further, if the system frequency accuracy is sufficient, an independent oscillator can be used for the reference oscillator 16. Frequency errors less than about ten percent of the signalling (bit) rate do not seriously affect performance.

The bit synchronization circuit is also shown by FIG. 3, and this can be a known circuit commonly referred to as a Data Transition Tracking Loop (DTTL). This loop includes a further matched filter 40, which can be identical to matched filters 18 and 22, which is connected to the output of phase detector 12. The signal from the matched filter 40 and the output signal from the summer 26 are applied to the sense correction circuit 42. The sense correction circuit 42 is a logic circuit which opens the circuit when the detector output indicates that there has been no phase change, and which reverses the error signal for transitions in one direction so that the error signals for all transitions accumulate. The output from the sense correction circuit 42 is applied through loop filter 44 to the voltage controlled bit synchronization oscillator 21. The output of oscillator 21 is applied through inverter 46 to the matched filter 40 so that this filter is sampled and dumped at the center of each bit period.

The matched filter 40 will have a zero output when the transitions of the bit synchronization oscillator 21 coincide with the transitions of the received signal. If the transitions do not coincide, the filer 40 has an output which is applied through the loop filter 44 to the oscillator 21 to correct the same so that the transitions coincide. The sense correction circuit 42 monitors the values of the instant and the previous bits and modifies the sense of the correction signal from the output of filter 40 before it is applied to the loop filter 44. This circuit holds the oscillator 21 at the correct phase to control the matched filters 18 and 22 of the differential phase detector system, whereby they are sampled at the end of each bit period and dumped, so that the filters can integrate the next bit signal.

FIG. 4 illustrates a digital differential phase shift keyed signal wherein quaternary (four phase) modulation is used, rather than binary modulation as shown by FIG. 1. Five bits are illustrated and the information is provided by the baud (transition from one bit to the next) as in the signal shown in FIG. 1. In FIG. 4, the wave is shifted +90° in phase from bit one to bit two, 180° between bit two and bit three, and −90° between bit three and bit four. There is no change in phase between bits four and five. The detection system shown in FIG. 5 detects the quaternary phase shift signal and provides four distinct outputs, which are shown by FIG. 4. The system of FIG. 5 has two output lines each of which provides a binary output, to thereby furnish four different signals.

In FIG. 5, many of the components of the system are the same as in FIG. 3 and are designated by the same numerals. The input signal is applied to the two phase detectors 12 and 14 which receive quadrature reference waves from oscillator 16. The outputs of the phase detectors are applied through matched filters 18 and 22 and delay circuits 19 and 23 to multipliers 20 and 24, as in FIG. 3. The outputs of the multipliers are added by summer 26.

In FIG. 5, two additional multipliers 50 and 52 are connected to the outputs of matched filters 18 and 22 and the outputs of delay circuits 19 and 23. Multiplier 50 has its inputs connected to filter 18 and to delay circuit 23, which is connected to filter 22. Multiplier 52 has its inputs connected to filter 22 and to delay circuit 19, which is connected to filter 18. The outputs of multipliers 50 and 52 are applied to summer 54, with the output of multiplier 50 being applied through inverter 51 so that the multiplier outputs are in effect subtracted by the summer 54. The outputs of summers 26 and 54 are applied to two further summers 56 and 58. The output of summer 54 is applied through inverter 55 to summer 58 so that summer 58 in effect subtracts the outputs of summers 26 and 54, while summer 56 adds the outputs of summers 26 and 54. The outputs of summers 56 and 58 are connected to the detector output terminals 60 and 62, which provide the quaternary outputs, as illustrated in FIG. 4.

The control of the reference oscillator 16 is different in the quaternary detection system of FIG. 5, as compared to the binary system of FIG. 3. In the system of FIG. 3, the sine and cosine terms from filters 18 and 22 are multiplied to provide a signal representing the sine of twice the angle $\phi_i$. In the system of FIG. 5, a signal representing the sine of four times the angle $\phi_i$ is required, which is derived by the components shown in FIG. 5. The multiplier 30 which has an output $\sin \phi_i \cos \phi_i$ is used as in FIG. 3. In addition, multiplier 65 has both inputs connected to matched filter 18 to povide $\sin^2\phi$, and multiplier 66 has both inputs connected to filter 22 to provide $\cos^2\phi$. The output of multiplier 66 is applied to summer 68 and the output of multiplier 65 is applied through inverter 67 to summer 68, so that summer 68 provides the output $\cos^2\phi - \sin^2\phi$. The output of multiplier 30 and the output of summer 68 are applied to multiplier 70, which provides the output $(\cos^2\phi - \sin^2\phi) \sin \phi \cos \phi$. This signal is applied through loop filter 32, 33, 34 to the voltage controlled reference oscillator 16, and controls the same in accordance with the sine of four times the angle $\phi$. The lock detector and sweep circuiit 36 operates in the same way as in the system of FIG. 3.

A data transition tracking loop controls the bit synchronization oscillator 21, and is somewhat different than the loop in the system of FIG. 3. A pair of matched filters 72 and 74 are connected to the outputs of phase detectors 12 and 14, respectively. The outputs of the matched filters are applied to summer 76 so that the transitions in both branches of the detection system are combined and utilized in the tracking loop. This is necessary in the four phase system as it is possible that a number of successive transitions will not produce an output in one of the phase detectors.

The output of summer 76 is applied through the sense correction circuit 78 and the loop filter 44 to the voltage controlled bit synchronization oscillator 21. The correction circuit 78 is coupled to the two detector outputs 60 and 62, and may be a logic circuit which opens the circuit when there is no change in phase, and which corrects the transition signals so that they accumulate rather than cancel each other. The bit synchronization signal from oscillator 21 is applied directly to the matched filters 18 and 22 in the two branches of the detection system, and is applied through inverter 80 to the matched filters 72 and 74 in the data transition tracking loop.

Parts of the detection system of FIG. 5 can be used for detecting a modified binary differential phase shift keyed signal in which successive bits differ in phase by either +90° or −90°, rather than by 0° or 180° as in the signal illustrated in FIG. 1. To detect such a signal, the multipliers 50 and 52, and the summer 54 of the system of FIG. 5 can be used. The output of summer 54 is a binary signal which represents the phase shift modulation of the applied signal. For such a system, the multipliers 20 and 24, and the summers 26, 56 and 58 can be omitted from the system shown in FIG. 5. The I-Q loop for controlling the reference oscillator 16, and the data transition tracking loop for controlling the bit synchronization oscillator 21 can be as shown in FIG. 5 and described.

A variation of the system of FIG. 5 can also be used for detecting a quaternary phase shift keyed signal in which the phase changes by ± 45° or ±135°, instead of by 0°, +90°, 180° and −90°, as illustrated in FIG. 4. Such a detection system will require an I-Q loop which controls the reference oscillator in accordance with eight times the phase angle of the received signal, $\phi_i$. As stated above, if the system frequency accuracy is sufficient, an independent oscillator can be used, and the I-Q loop is not required. When detecting the ± 45° or ± 135° signal, the output is derived from the two summers 26 and 54 directly, which provide two binary outputs, like the outputs illustrated in FIG. 4. For such use, the summers 56 and 58, and the inverter 55 can be omitted from the system of FIG. 5.

The digital detection system for differential phase shift keyed signals of the invention can be constructed in integrated circuit form so that it can be provided as a compact device. Signals are stored in ditigal form so that delay lines or high-Q circuits are not required. The detection system requires minimum operating power so that it is suitable for portable battery operated devices, such as a paging receiver. The system is suitable for use with binary phase shift keyed signals or with quaternary phase shift signals.

We claim:

1. A differential phase shift detection system including in combination, first and second multipliers, each having a first input adapted to receive a digital phase shift signal, a second reference input, and an output, local oscillator means providing a first output and a second output differing in phase by 90° from said first output, said first and second outputs being coupled respectively to said second inputs of said first and second multipliers, firt and second filters having inputs connected respectively to said outputs of said first and second multipliers, and each having an output, first and second delay means having inputs and outputs and each providing a delay of one digital bit, said inputs of said first and second delay means being connected respectively to said outputs of said first and second filters, third and fourth multipliers each having first and second inputs and an output, said inputs of said third multiplier being connected to said output of said first filter and to said output of one of said delay means, and said inputs of said fourth multiplier being connected to said output of said second filter and to said output of the other one of said delay means, and summing means coupled to said outputs of said third and fourth multipliers for combining the output signals thereof.

2. A detection system in accordance with claim 1, wherein said first and second filters are matched filters each including an integrate, sample and dump circuit, and having a synchronization input, and wherein said detection system includes bit synchronization signal means coupled to said synchronization inputs of said first and second matched filters to sample and dump the same at the end of each bit of the applied digital phase shift signal.

3. A detection system in accordance with claim 2, wherein said bit synchronization signal means includes a further matched filter coupled to said first multiplier, a voltage controlled oscillator, and means coupling said further matched filter to said voltage controlled oscillator to control the same so that the frequency of the signal from said oscillator corresponds to the bit rate of the applied digital signal.

4. A detection system in accordance with claim 3, including means directly applying said signal from said oscillator to said first and second matched filters, and inverter means for applying said signal from said oscillator to said further matched filter.

5. A detection system in accordance with claim 3 wherein said means coupling said further matched filter to said voltage controlled oscillator includes a loop filter.

6. A detection system in accordance with claim 5 wherein said means coupling said further matched filter to said voltage controlled oscillator includes a sense correction circuit coupled between said further matched filter and said loop filter, said sense correction circuit being coupled to said summing means and correcting the signal applied to said loop filter in accordance with the output of said summing means.

7. A phase shift detection system in accordance with claim 2 further including a data transition tracking loop connected to said output of one of said multipliers and to said summing means and providing a bit synchronization signal, and means applying said bit synchronization signal to said first and second matched filters for synchronizing the same with the applied digital signal.

8. A phase shift detection system in accordance with claim 1 further including an I-Q loop coupled to said outputs of said first and second filters and having an output coupled to said local oscillator means for synchronizing said local oscillator means with the applied digital signal.

9. A phase shift detection system in accordance with claim 1 including control means for said local oscillator means having further multiplier means coupled to said outputs of said first and second filters, and means including loop filter means coupling said multiplier means to said local oscillator means for synchronizing the same with the applied digital signal.

10. A detection system in accordance with claim 9 wherein said control means includes lock detection and sweep circuit means coupled to said loop filter for causing the frequency of said local oscillator means to sweep through a range of frequencies to reach the frequency of the applied digital signal.

11. A detection system in accordance with claim 1 wherein said inputs of said third multiplier are connected to said outputs of said first filter and said first delay means, and said inputs of said fourth multiplier are connected to said outputs of said second filter and said second delay means, and wherein said summing means adds the output signals of said third and fourth multipliers.

12. A detector system in accordance with claim 11 further including a fifth multiplier having inputs connected to said outputs of said first filter and said second delay means, and a sixth multiplier having inputs connected to said outputs of said second filter and said first delay means, and second summing means coupled to the outputs of said fifth and sixth multipliers and acting to subtract the outputs thereof.

13. A detection system in accordance with claim 12 further including third and fourth summing means, said third summing means having a pair of inputs connected to said outputs of said first recited summing means and said second summing means and adding the outputs thereof, said fourth summing means having a pair of inputs connected to said outputs of said first and second summing means and subtracting the outputs thereof.

14. A detection system in accordance with claim 13 including an I-Q loop having inputs coupled to said outputs of said first and second filters and having an output coupled to said local oscillator means for controlling the same, said loop including
a seventh multiplier having inputs connected to said first and second filters, and an output,
an eighth multiplier having a pair of inputs connected to said first filter for squaring the output thereof,
a ninth multiplier having a pair of inputs connected to said second filter for squaring the output thereof,
fifth summing means coupled to said eighth and ninth multipliers for subtracting the outputs thereof,
a tenth multiplier having inputs connected to said output of said seventh multiplier and to the output of said fifth summing means, and
filter means coupling the output of said tenth multiplier to said local oscillator means.

15. A detection system in accordance with claim 13 wherein said first and second filters are matched filters each including an integrate, sample and dump circuit, and having a synchronization input, and
wherein said detection system includes a bit synchronization oscillator coupled to said synchronization input of said matched filters,
third and fourth matched filters coupled to said outputs of said first and second multipliers, respectively,
fifth summing means coupled to said third and fourth matched filters for adding the output signals thereof,
sense correction means coupled to the outputs of said third, fourth and fifth summing means,
loop filter means coupling the output of said sense correction means to said synchronization oscillator, and
inverter means coupling the output of said synchronization oscillator to said third and fourth matched filters.

16. A detection system in accordance with claim 1 wherein said inputs of said third multiplier are connected to said outputs of said first filter and said second delay means, and said inputs of said fourth multiplier are connected to said outputs of said second filter and said first delay means, and wherein said summing means subtracts the output signals of said third and fourth multipliers.

* * * * *